(12) United States Patent
Boston et al.

(10) Patent No.: US 12,421,766 B2
(45) Date of Patent: Sep. 23, 2025

(54) APPARATUS, METHOD AND A COMPUTER PROGRAM FOR RETAINING A HAND PORTABLE ELECTRONIC DEVICE

(71) Applicant: ZEBRA TECHNOLOGIES CORPORATION, Lincolnshire, IL (US)

(72) Inventors: Jacob Peter Boston, Windsor (GB); Anthony John Rainbow, Windsor (GB)

(73) Assignee: Zebra Technologies Corporation, Lincolnshire, IL (US)

(\*) Notice: Subject to any disclaimer, the term of this patent is extended or adjusted under 35 U.S.C. 154(b) by 278 days.

(21) Appl. No.: 17/866,237

(22) Filed: Jul. 15, 2022

(65) Prior Publication Data
US 2023/0074807 A1  Mar. 9, 2023

(30) Foreign Application Priority Data
Jul. 16, 2021  (GB) ..................... 2110260

(51) Int. Cl.
*E05B 73/00*  (2006.01)
*E05B 47/00*  (2006.01)

(52) U.S. Cl.
CPC ...... *E05B 73/0082* (2013.01); *E05B 47/0002* (2013.01); *E05B 2047/0067* (2013.01); *E05B 2047/0094* (2013.01)

(58) Field of Classification Search
CPC ............. E05B 73/0082; E05B 47/0002; E05B 2047/0067; E05B 2047/0094
See application file for complete search history.

(56) References Cited

U.S. PATENT DOCUMENTS

| | | | |
|---|---|---|---|
| 2013/0187756 A1* | 7/2013 | Fisher | G05B 1/00 340/5.61 |
| 2014/0360232 A1* | 12/2014 | Al-Kahwati | G07C 9/00571 70/14 |
| 2015/0000571 A1* | 1/2015 | Stemen | E05G 1/005 109/23 |
| 2017/0188724 A1* | 7/2017 | Lin | F16M 13/00 |
| 2020/0190858 A1* | 6/2020 | Al-Kahwati | G07C 9/00571 |
| 2020/0311671 A1* | 10/2020 | Lundahl | G06Q 10/0836 |
| 2021/0047866 A1* | 2/2021 | Chen | E05B 17/2019 |
| 2021/0372171 A1* | 12/2021 | Valdes Rudd | E05B 81/08 |
| 2022/0215081 A1* | 7/2022 | Kadam | E05B 47/0603 |

FOREIGN PATENT DOCUMENTS

CN  114109184 A  \*  3/2022

\* cited by examiner

*Primary Examiner* — Mark A Williams

(57) ABSTRACT

An apparatus, a method and a computer program are provided. The apparatus comprises a retainer, for receiving and retaining a hand portable electronic device, that comprises a lock and at least one sensor. The lock is configured to transition the retainer between an unlocked configuration and a locked configuration. In the locked configuration the retainer is arranged to prevent release of a hand portable electronic device retained by the retainer. The sensor is arranged to receive at least one wireless signal emitted by the hand portable electronic device retained by the retainer. The apparatus further comprises processing circuitry configured to control the lock to transition the retainer from the locked configuration to the unlocked configuration, based on the at least one wireless signal received by the sensor, in order to enable the hand portable electronic device to be released from the retainer.

15 Claims, 15 Drawing Sheets

APPARATUS, METHOD AND A COMPUTER PROGRAM FOR RETAINING A HAND PORTABLE ELECTRONIC DEVICE

FIELD OF THE INVENTION

Embodiments of the present disclosure relate to the retention of a hand (handle held) portable electronic devices. Some relate to the secure retention of a hand portable electronic device in a logistics environment.

BACKGROUND

In some circumstances, hand portable electronic devices that are used in a commercial environment might be susceptible to theft or misuse. It may be desirable to prevent such theft or misuse.

SUMMARY

According to various, but not necessarily all, embodiments there is provided an apparatus comprising: a retainer, for receiving and retaining a hand portable electronic device, comprising: a lock configured to transition the retainer between an unlocked configuration and a locked configuration, wherein in the locked configuration the retainer is arranged to prevent release of a hand portable electronic device retained by the retainer; and at least one sensor arranged to receive at least one wireless signal emitted by the hand portable electronic device retained by the retainer; and processing circuitry configured to control the lock to transition the retainer from the locked configuration to the unlocked configuration, based on the at least one wireless signal received by the sensor, in order to enable the hand portable electronic device to be released from the retainer.

The retainer may be configured to be movable between a first position and a second position. The lock may be configured to transition the retainer from the unlocked configuration to the locked configuration in response to the retainer being moved to the second position.

The lock may comprise a latch bolt that is biased to transition the lock into the locked configuration when the retainer is moved to the second position.

The retainer may comprise a keep that is positioned to receive the latch bolt when the retainer is in the second position.

The retainer may be configured to be movable between the second position and a third position. The first position may be a reception position in which the retainer is configured to receive the hand portable electronic device. The second position may be a retention position in which the retainer is configured to retain the hand portable electronic device. The third position may be a rest position.

The retainer may be configured such that a hand portable electronic device cannot be received by the retainer when the retainer is in the third position. The second position may be between the first position and the third position.

The retainer may further comprise: a detector configured to detect movement of the retainer away from the third position and towards the second position. The processing circuitry may be configured to respond to detection, by the detector, of movement of the retainer from the third position by retracting the latch bolt. The detector may comprise a switch and is configured to detect movement of the retainer from the third position based, at least in part, on release of the switch.

The processing circuitry may be configured to respond to detection of movement of the retainer from the third position by the detector by retracting the latch bolt for a predetermined period of time.

The at least one sensor may comprise at least one light sensor. The at least one wireless signal may be at least one light signal emitted by the display of the hand portable electronic device retained by the retainer.

The at least one light sensor may comprise at least a first light sensor and at least a second light sensor. The first light sensor may be arranged to receive a first light signal emitted by a first portion of the display of the hand portable electronic device retained by the retainer. The second light sensor may be arranged to receive a second light signal emitted by a second portion of the display of the hand portable electronic device retained by the retainer. The first light signal may be a first time-varying light pattern and the second light signal may be a second time-varying light pattern.

The retainer may further comprise a clamp arranged to prevent release of a hand portable electronic device retained by the retainer when the retainer is in the locked configuration.

According to various, but not necessarily all, embodiments there is provided a method comprising: receiving at least one wireless signal emitted by a hand portable electronic device retained by a retainer while the retainer is in a locked configuration in which the retainer prevents release of the hand portable electronic device retained by the retainer; and controlling a lock to transition the retainer from the locked configuration to an unlocked configuration, based on at least one wireless signal received from the hand portable electronic device, in order to enable the hand portable electronic device to be released from the retainer.

The retainer may be movable between a first position and a second position. The method may further comprise transitioning the retainer from the unlocked configuration to the locked configuration in response to the retainer being moved to the second position.

The lock may comprise a latch bolt that is biased to transition the lock into the locked configuration when the retainer is moved to the second position. The retainer may comprise a keep that receives the latch bolt when the retainer is in the second position.

The retainer may be configured to be movable between the second position and a third position. The second position may be between the first position and the third position.

The method may further comprise: responding to detection of movement of the retainer away from the third position by retracting the latch bolt.

The at least one wireless signal may be at least one light signal emitted by the display of the hand portable electronic device retained by the retainer.

According to various, but not necessarily all, embodiments there is provided a computer program comprising computer program instructions that, when executed by processing circuitry, causes the method described above to be performed.

According to various, but not necessarily all, embodiments there is provided an apparatus, comprising: a retainer, for receiving and retaining a hand portable electronic device, movable between a first position, a second position and a third position, the retainer comprising: a lock, comprising a latch bolt, configured to transition the retainer from an unlocked configuration to a locked configuration when the retainer is the second position, wherein in the locked configuration the retainer is arranged to prevent release of a hand portable electronic device retained by the retainer; a keep configured to receive the latch bolt; a detector configured to detect movement of the retainer away from the first position and towards the second position; and processing circuitry configured to respond to detection, by the detector, of movement of the retainer from the first position towards the second position by retracting the latch bolt in order to enable the retainer to move beyond the second position to the third position, without transitioning from the unlocked configuration to the locked configuration at the second position, wherein in the third position the retainer is configured to receive a hand portable electronic device.

The first position may be a rest position. The second position may be a retention position in which the retainer is configured to retain the hand portable electronic device.

The third position may be a reception position in which the retainer is configured to receive the hand portable electronic device.

According to various, but not necessarily all, embodiments there is provided examples as claimed in the appended claims.

BRIEF DESCRIPTION OF THE SEVERAL VIEWS OF THE DRAWINGS

Some examples will now be described with reference to the accompanying drawings in which.

DETAILED DESCRIPTION

Figure 1A:
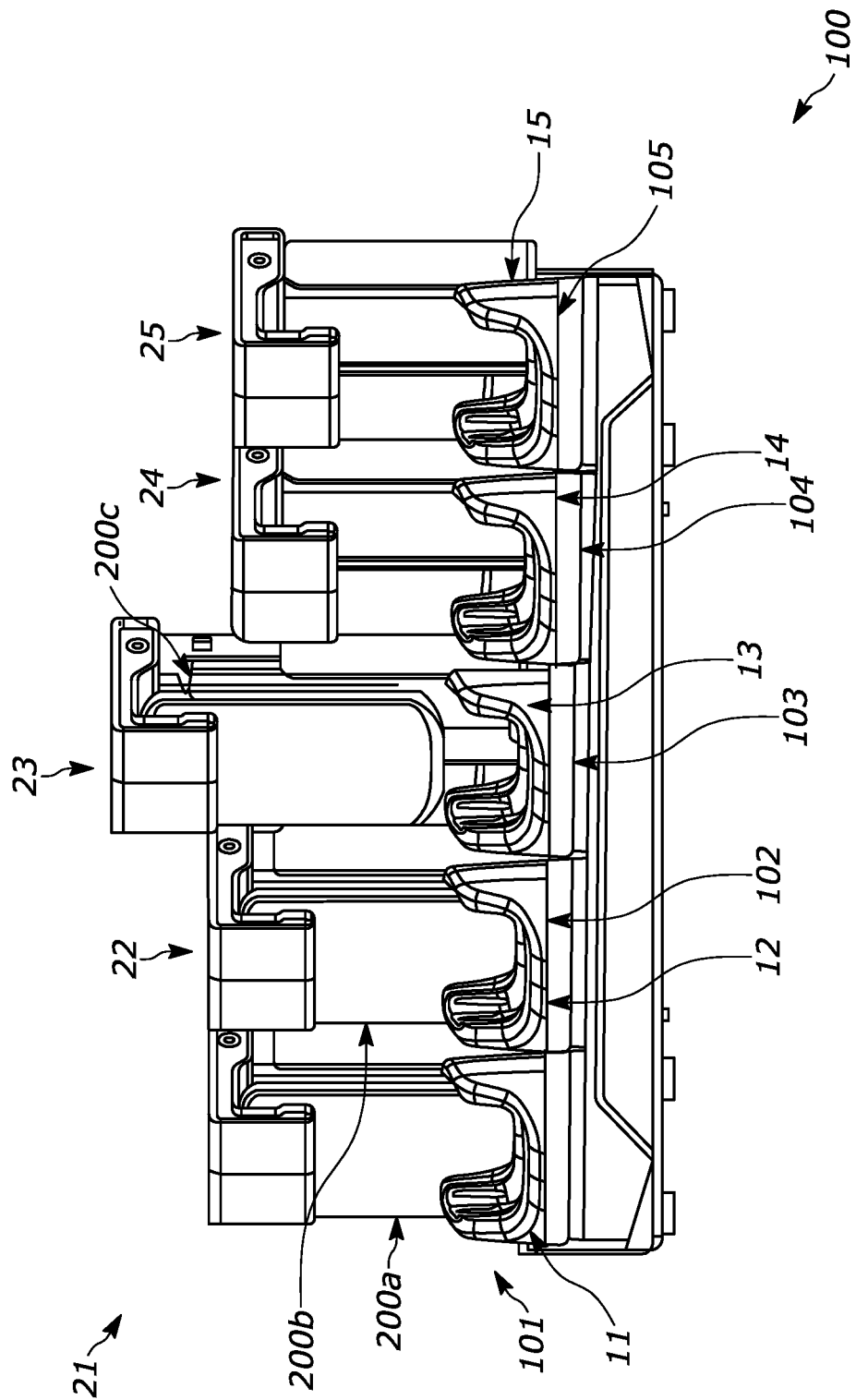
FIG. 1A illustrates a front elevation of an apparatus.
Figure 1B:
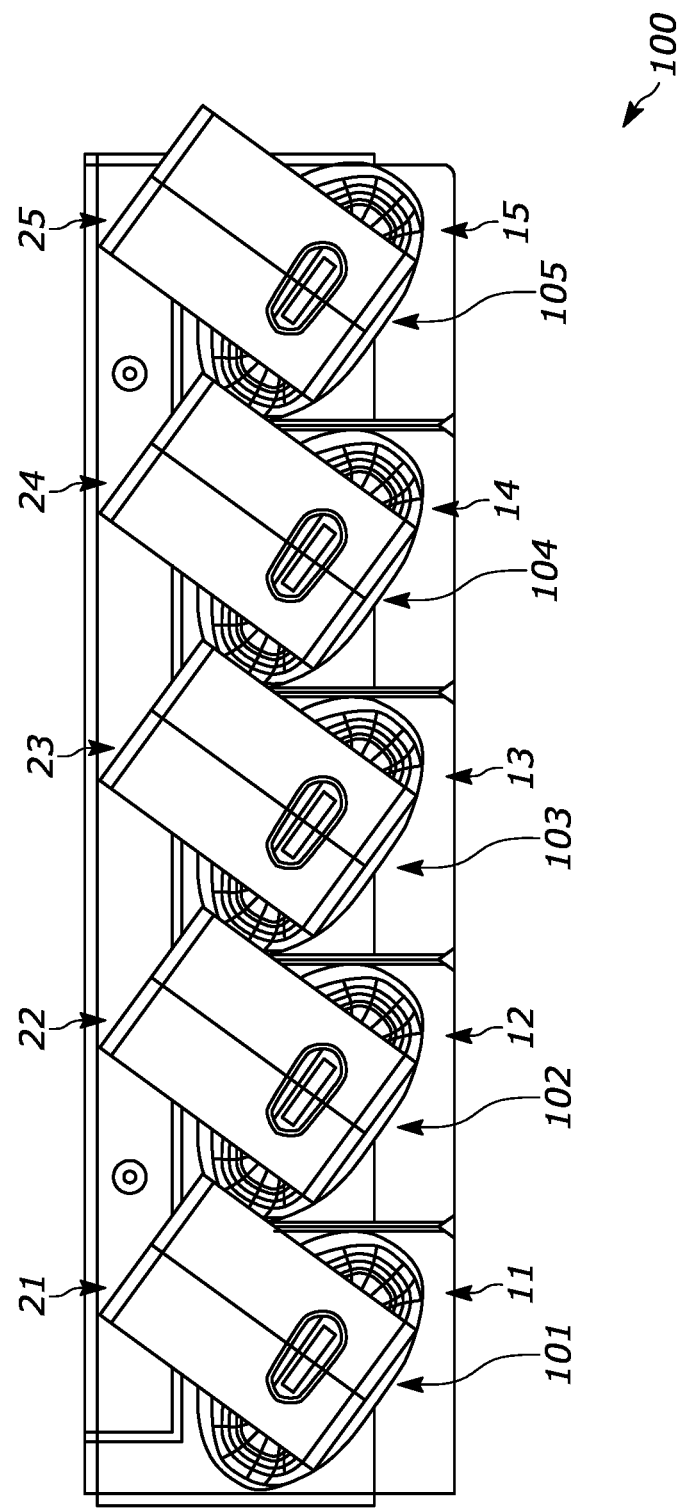
FIG. 1B illustrates a plan view of the apparatus.
Figure 1C:
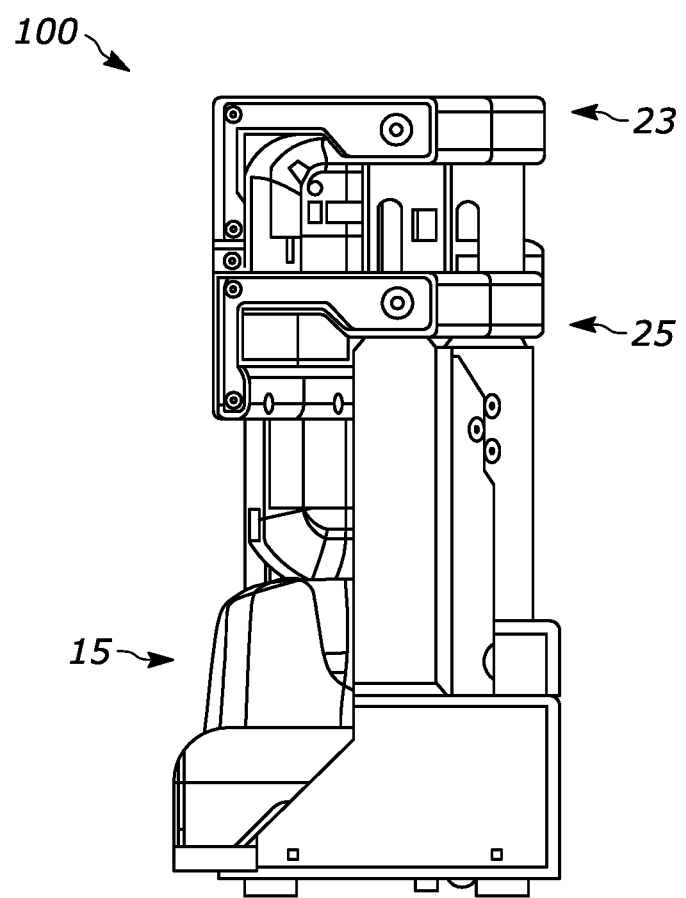
FIG. 1C illustrates a side elevation of the apparatus.
Figure 2A:
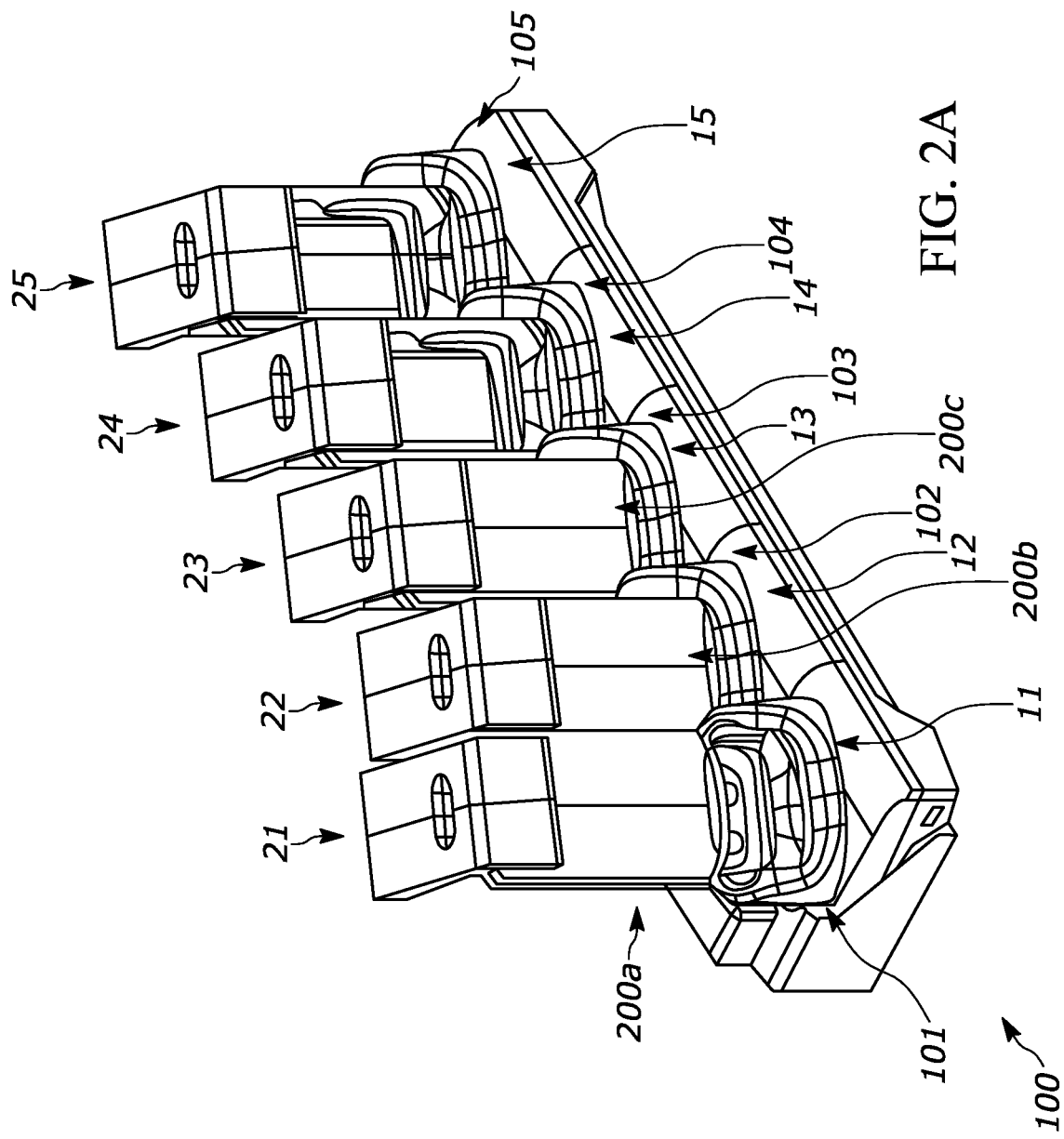
FIG. 2A illustrates a first perspective view of the apparatus.
Figure 2B:
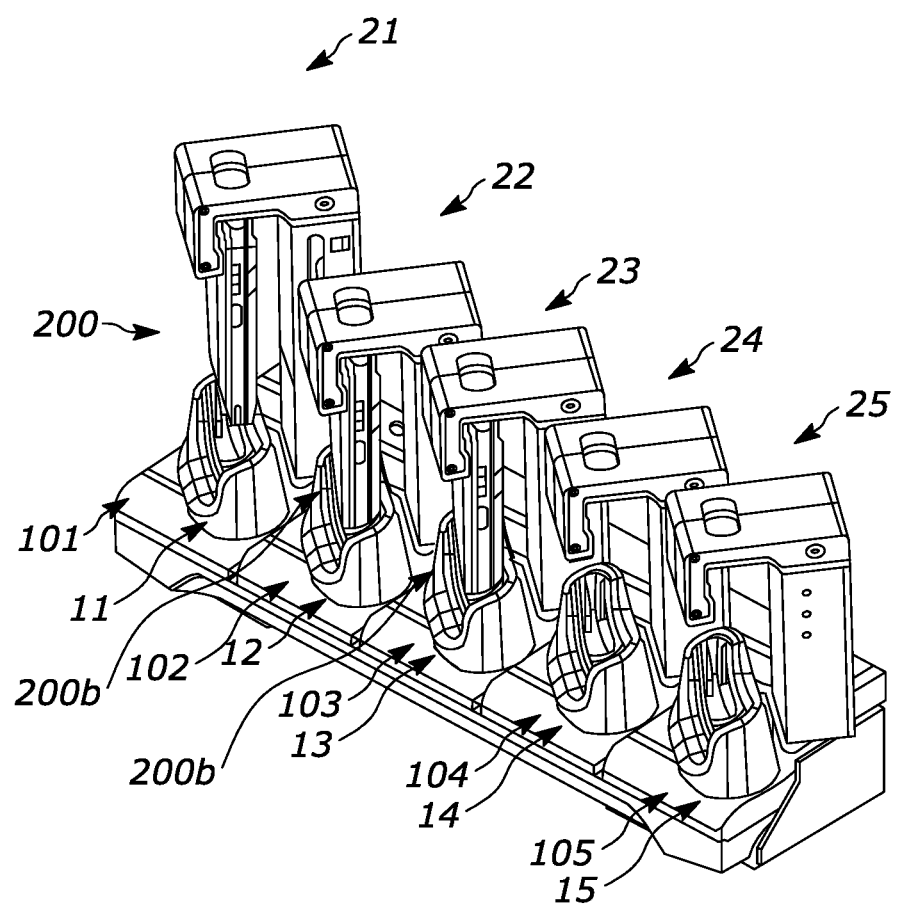
FIG. 2B illustrates a second perspective view of the apparatus.

FIGS. 1A, 1B and 1C illustrate front, plan and side views of an apparatus 100. FIGS. 2A and 2B illustrate first and second perspective views of the apparatus 100 respectively.

The apparatus 100 is for securely retaining one or more hand portable electronic devices 200a, 200b, 200c, such that each of the devices 200a, 200b, 200c may only be retrieved by a person that is able to unlock that device 200a, 200b, 200c, for example, by inputting a password or personal identification number (PIN). This is described in further detail below.

In the illustrated example, the apparatus 100 comprises five cradles 101-105, each cradle 101-105 being for holding a hand portable electronic device 200a, 200b, 200c in position. In other examples, more or fewer cradles 101-105 may be provided.

Each cradle 101-105 comprises a base 11-15. The base 11-15 is for supporting a device 200a, 200b, 200c, e.g., from its underside. Each base 11-15 may, for example, optionally comprise an electrical connector for supplying electrical power to a device 200a, 200b, 200c in order to charge the battery of the device 200a, 200b, 200c.

Each cradle 101-105 further comprises a retainer 21-25. Each retainer 21-25 is movable into a plurality of positions to enable a hand portable electronic device 200a, 200b, 200c to be received by the retainer 21-25, retained by the retainer 21-25 and released by the retainer 21-25.

Figure 3:
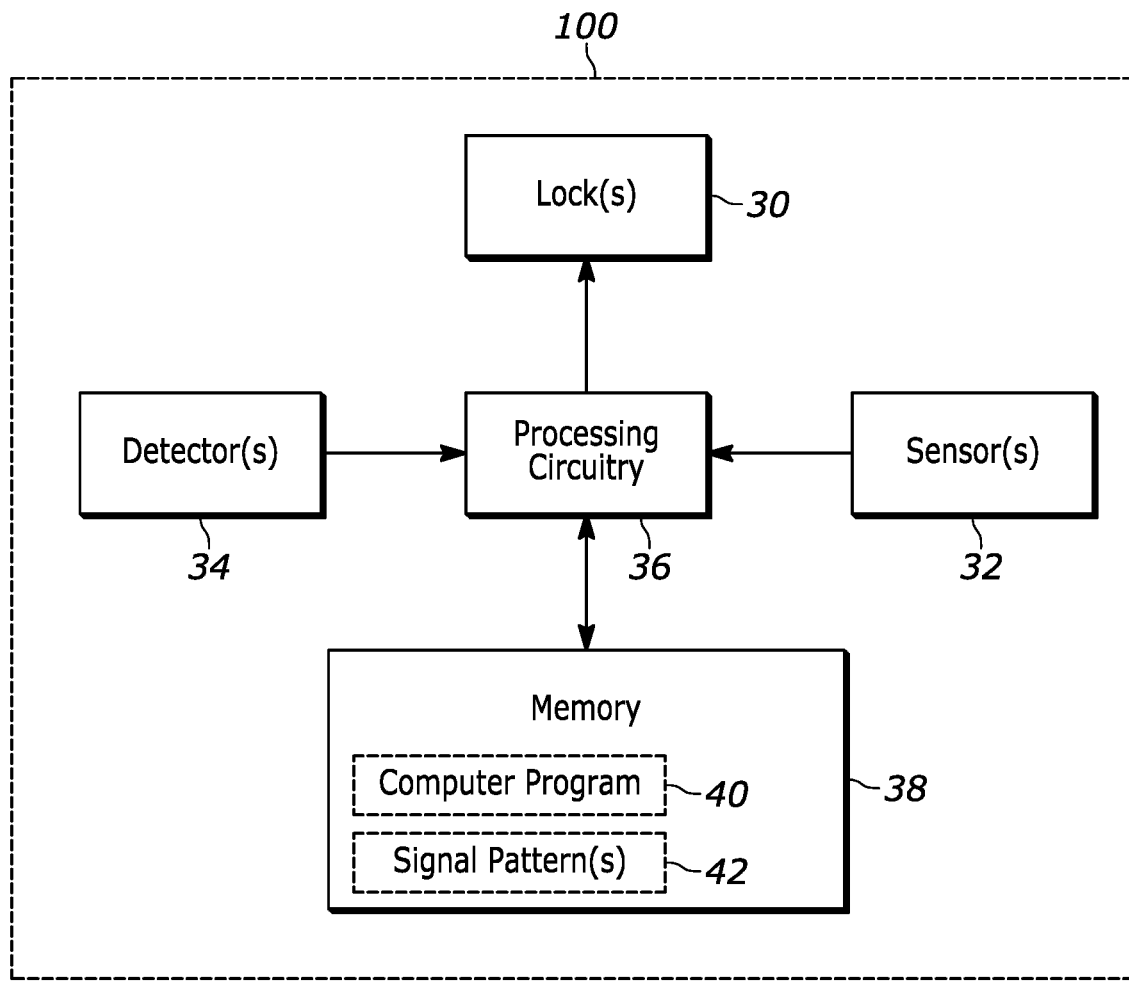
FIG. 3 illustrates a schematic of electronics of the apparatus.
Figure 3:
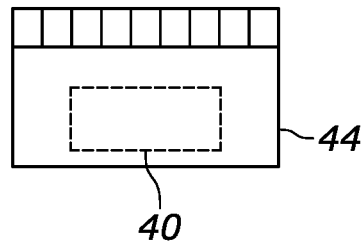

FIG. 3 illustrates a schematic of electronics of the apparatus 100. The apparatus 100 includes at least one lock 30, at least one sensor 32, at least one detector 34, processing circuitry 36 and memory 38. Each retainer 21-25 comprises at least one lock 30, at least one sensor 32 and at least one detector 34. For example, if there are five retainers 21-25 as illustrated in FIGS. 1A to 2B, there are at least five locks 30, at least five sensors 32 and at least five detectors 34. However, there need not be a processing circuitry 36 and a memory 38 per retainer 21-25.

The elements 30, 32, 34, 36 and 38 are operationally coupled and any number or combination of intervening elements can exist (including no intervening elements).

The description that follows relates to the operation of a single retainer 21 of the apparatus 100. It will be appreciated by those skilled in the art that the other retainers 22-25 may be operated in the same manner.

The lock 30 is an electronically operated lock that is controlled by the processing circuitry 36. The lock 30 may be a latch and may therefore comprise a latch bolt and a keep. The lock/latch 30 may be a solenoid lock.

The latch bolt may be biased towards a latching position. If the latch bolt is suitably aligned with the keep while biased towards the latching position, the latch bolt will enter the keep, thereby placing the retainer 21 into a locked configuration. The processing circuitry 36 is configured to control the lock 30 to cause the retainer 21 to transition from the locked configuration to an unlocked configuration. The processing circuitry 36 may cause the retainer 21 to transition from the locked configuration to the unlocked configuration by causing the latch bolt to retract (e.g., retract from the keep). In some examples, the processing circuitry 36 might control the lock 30 via an electronic driver.

The retainer 21 might comprise one or multiple sensors 32. Each of the sensors 32 is configured to receive at least one wireless signal emitted by a hand portable electronic device 200a. The wireless signal might be a time-varying signal. It might be a light signal or an audio signal, for instance. If the wireless signal is a light signal, each sensor 32 is a light sensor such as a photodiode. If the wireless signal is an audio signal, each sensor 32 is an audio sensor such as a microphone.

The processing circuitry 36 is configured to receive inputs from each sensor 32. The processor circuitry 36 is configured to receive inputs from the sensor(s) 32 and configured to control the lock 30 of the retainer 21 based on those inputs. That is, the processing circuitry 36 is configured to control the lock 30 to transition the retainer 21 from the locked configuration to the unlocked configuration based on at least one wireless signal received by each sensor 32, due to inputs received from each sensor 32 following reception of the wireless signal at the sensor 32. The processing circuitry 36 may, for example, cause a latch bolt of the lock 30 to retract in order to transition the retainer 21 from the locked configuration to the unlocked configuration.

The detector 34 is configured to detect movement of the retainer 21 from and to its default/rest/starting position. The detector 34 might, for example, comprise a (micro)switch. The detector 34 may be configured to detect movement of the retainer 21 from the default position based, at least in part, on release of the switch.

The processing circuitry 36 is configured to receive inputs from the detector 34. The processor circuitry 36 is configured to receive inputs from the detector 34 and configured to control the lock 30 of the retainer 21 based on those inputs. That is, the processing circuitry 36 is configured to control the lock 30 to transition the retainer 21 from the locked configuration to the unlocked configuration based on the inputs from the detector 34. The processing circuitry 36 may, for example, cause a latch bolt of the lock 30 to retract in order to transition the retainer 21 from the locked configuration to the unlocked configuration.

The processing circuitry 36 is illustrated as a single component/circuitry it may be implemented as one or more separate components/circuitry some or all of which may be integrated/removable. The processing circuitry 36 may comprise one or more processor, each of which may be single core or multi-core.

The processing circuitry 36 is configured to read from and write to the memory 38. The processing circuitry 36 may also comprise an output interface via which data and/or commands are output by the processing circuitry 36 and an input interface via which data and/or commands are input to the processing circuitry 36.

The memory 38 stores a computer program 40 comprising computer program instructions (computer program code) that controls the operation of the apparatus 100 when loaded into the processing circuitry 36. The computer program instructions, of the computer program 40, provide the logic and routines that enables the apparatus to perform aspects of the method illustrated in FIG. 4. The processing circuitry 36, by reading the memory 38, is able to load and execute the computer program 40.

The computer program 40 may arrive at the apparatus 100 via any suitable delivery mechanism 44. The delivery mechanism 44 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, or an article of manufacture that comprises or tangibly embodies the computer program 40. The delivery mechanism 44 may be a signal configured to reliably transfer the computer program 40. The apparatus 100 may propagate or transmit the computer program 40 as a computer data signal.

The computer program instructions may be comprised in a computer program, a non-transitory computer readable medium, a computer program product, a machine-readable medium. In some but not necessarily all examples, the computer program instructions may be distributed over more than one computer program.

Although the memory 38 is illustrated as a single component/circuitry it may be implemented as one or more separate components/circuitry some or all of which may be integrated/removable and/or may provide permanent/semi-permanent/dynamic/cached storage.

Figure 4:
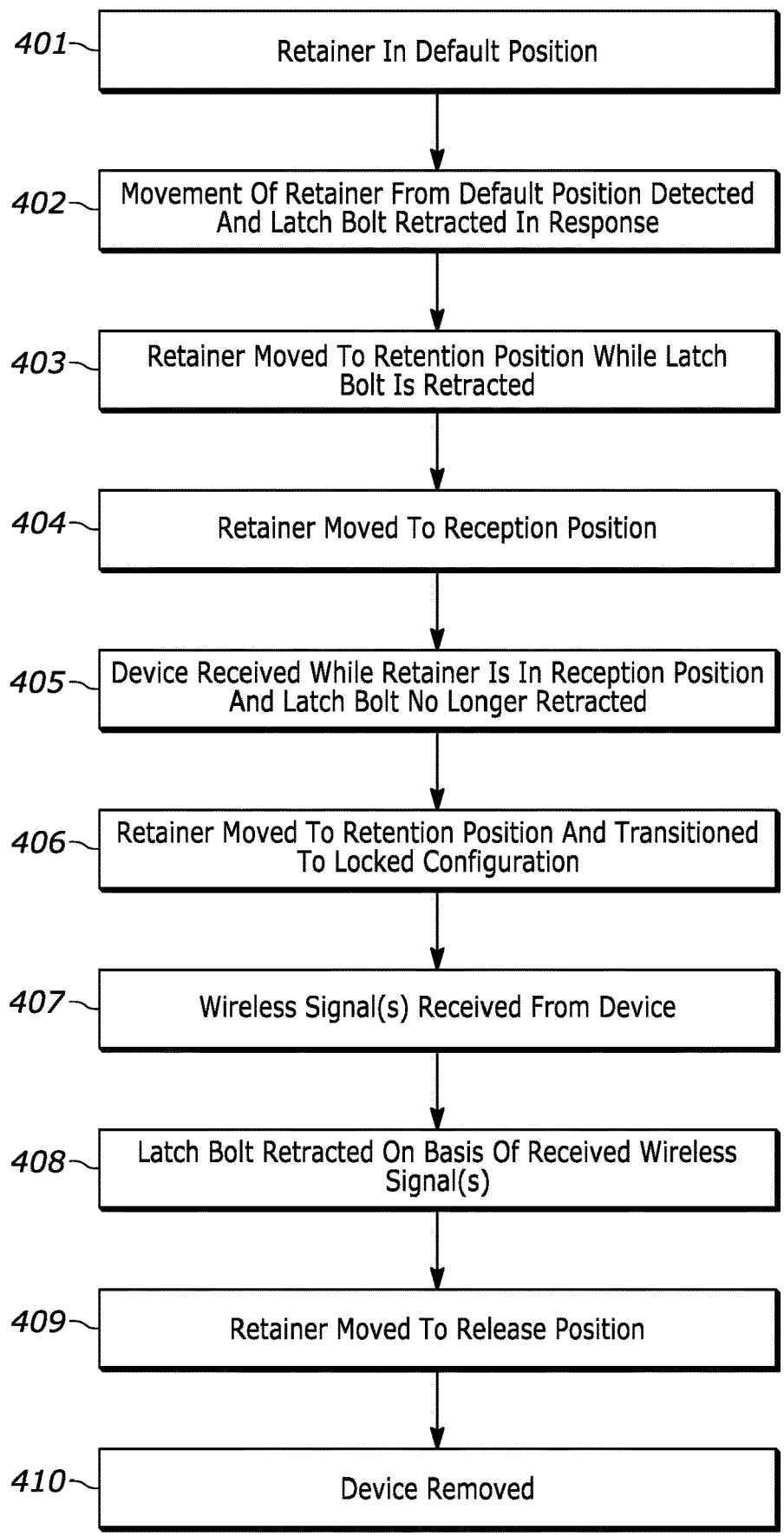
FIG. 4 illustrates a flow chart of a method.

FIG. 4 illustrates a flow chart that may be performed using any one of the retainers 21-25 of the apparatus 100. The reference numeral 21 will mainly be used for the retainer hereinafter for clarity.

In block 401 in FIG. 4, the retainer 21 is in its default/rest/starting position. This is the position the retainer 21 is in if the retainer 21 is not currently retaining a hand portable electronic device and no external force is being applied to the retainer 21 by a user. If an external force is applied to the retainer 21 by a user, following cessation of the application of the force, provided that no hand portable electronic device is received by the retainer 21, the retainer 21 might automatically (i.e., with no user intervention), revert back to the default position (e.g., under the influence of gravity).

Figure 5A:
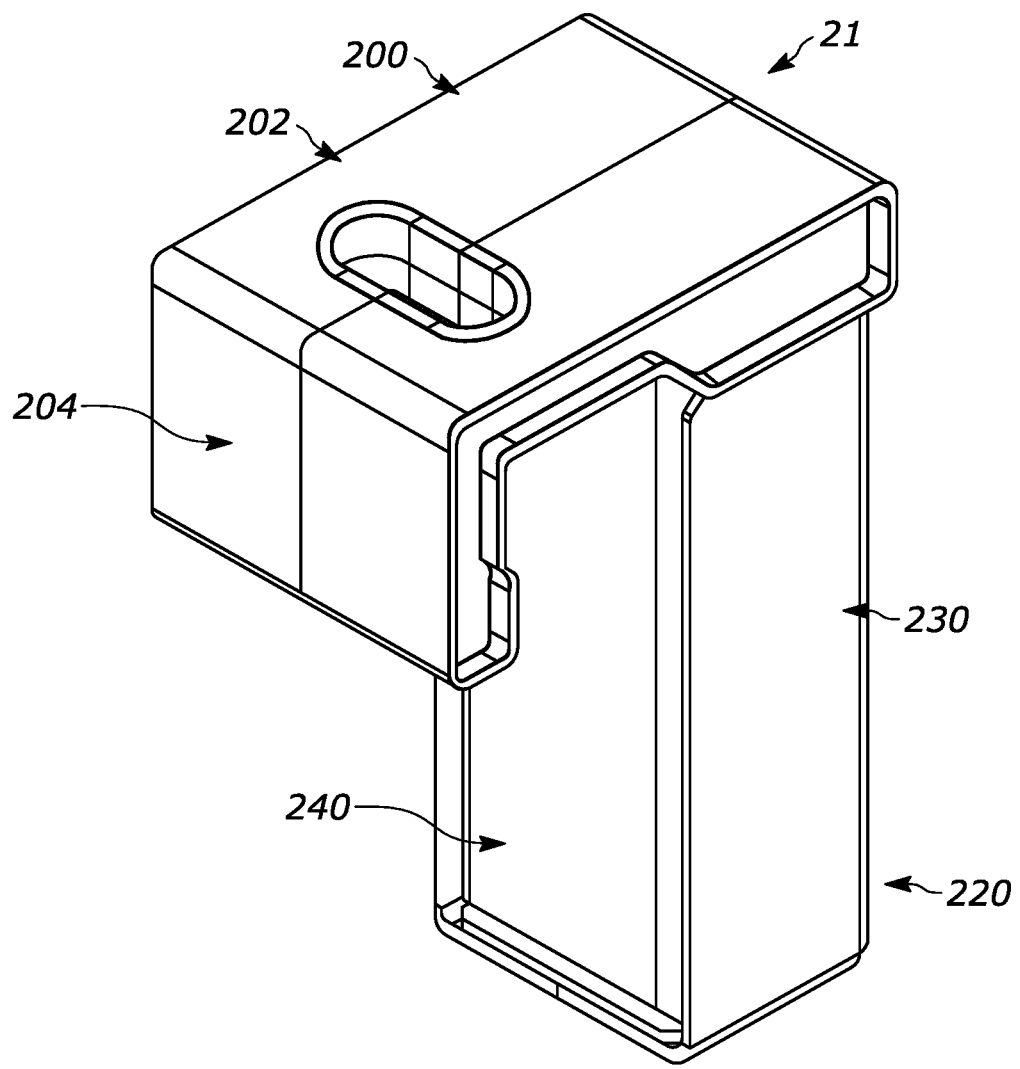
FIG. 5A illustrates a perspective view of a retainer of the apparatus in a default/rest/starting position.

FIG. 5A illustrates a perspective view of the retainer 21 in its default position and in its unlocked configuration. The retainer 21 comprises a clamp/canopy 200. The clamp 200 enables a hand portable electronic device to be secured in position in the apparatus 100. The clamp 200 comprises an overhanging portion 202 and a projecting portion 204. The overhanging portion 202 includes an aperture in the illustrated example.

The clamp 200 further comprises a support 220. The support 220 has a fixed part 230 and a moving part 240. The moving part 240 is movable relative to the fixed part 230. The moving part 240 may be moveable in a first direction and a second direction, where the second direction is opposite to the first direction. The first and second directions may be vertical directions, such as upwards and downwards respectively. In examples illustrated herein, the moving part 240 is (vertically) slidable relative to the fixed part 230. The moving part 240 is fixedly coupled to the clamp 200, such that when the moving part 240 moves, the clamp 200 also moves, and vice-versa.

The overhanging portion 202 of the clamp 200 extends outwardly from the moving part 240. It extends substantially orthogonally to the first direction, the second direction, the moving part 240 and the fixed part 230. The projecting portion 204 extends from the overhanging portion 202 in the downwards/second direction.

Figure 5B:
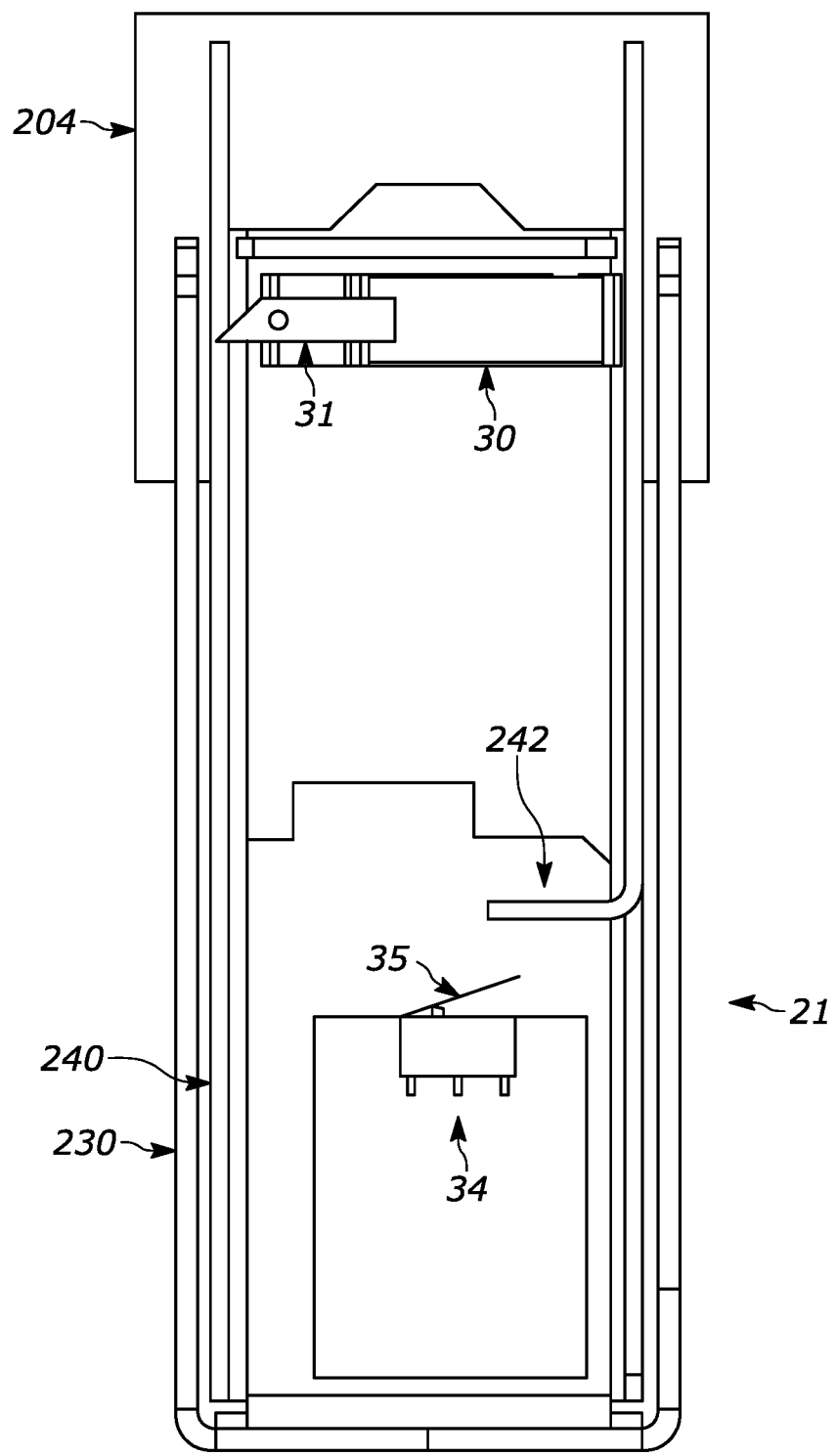
FIG. 5B illustrates a schematic showing internal components of the retainer while the retainer is in the default position.

FIG. 5B illustrates a schematic showing internal components of the retainer 21 while the retainer 21 is in the default position. FIG. 5B illustrates both the lock 30 and the detector 34 of the retainer 21. Both the lock 30 and the detector 34 are fixedly positioned in the retainer 21 such that they do not move when the moving part 240 moves. The lock 30 and the detector 34 may, for example, be fixedly positioned to the fixed part 230, such as fixed to one or more walls of the fixed part 230. In the illustrated implementation, the lock 30 and the detector 34 are supported by a rear wall of the fixed part 230.

In the illustrated implementation, the lock 30 comprises a latch bolt 31. The latch bolt 31 is biased towards a latching position. For example, the latch bolt may be spring-loaded towards the latching position. A keep for the latch bolt 31 is provided in the moving part 240. While the retainer 21 is in its default position, as illustrated in FIGS. 5A and 5B, the latch bolt 31 is not aligned with the keep and cannot, therefore, enter the keep even if it is biased towards the latching position.

The detector 34 is configured to detect when the retainer 21 enters or leaves the default position. In this example the detector 34 comprises a (micro)switch 35. The moving part 240 of the retainer 21 comprises an actuator 242 that is detected by the detector 34. For example, the actuator 242 may actuate the switch 35.

The processing circuitry 36 is configured to receive inputs from the detector 34. When the retainer 21 is in the default position, the processing circuitry 36 determines (e.g., through the presence or absence of a signal due to actuation of the switch 35) that the retainer 21 is in its default position.

The retainers labelled with the reference numerals 24 and 25 in FIGS. 1A, 1B, 1C, 2A and 2B are in the default position.

In block 402 in FIG. 4, a user moves the retainer 21 away from its default position in order to enable the retainer 21 to receive a hand portable electronic device. The retainer 21 may be moved in a first direction, such as upwards. The user may, for example, grip the clamp 200 with her hand and lift it upwards in order to move the retainer 21 away from its default position.

Figure 6A:
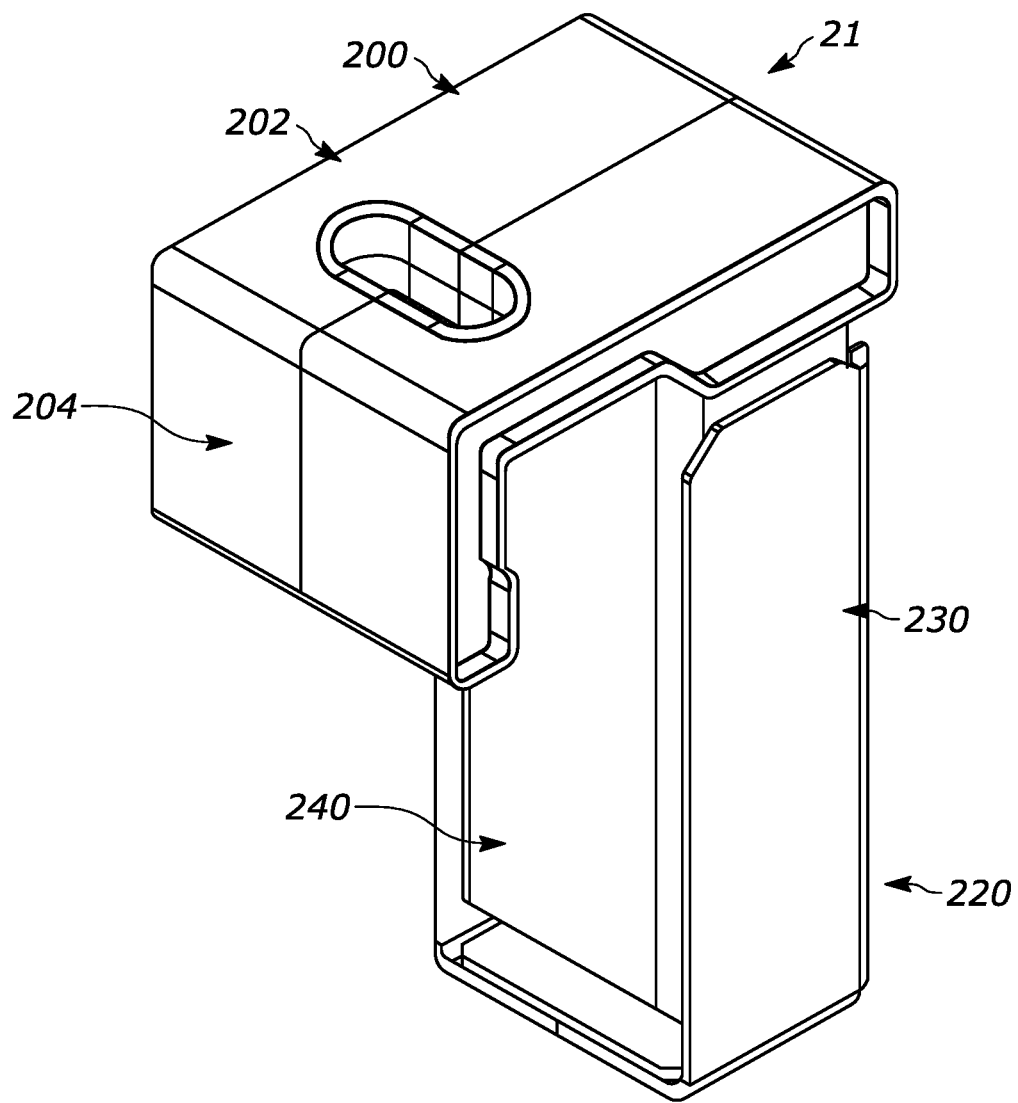
FIG. 6A illustrates a perspective view of the retainer of the apparatus positioned between the default position and a reception position, shortly after moving from the default position.
Figure 6B:
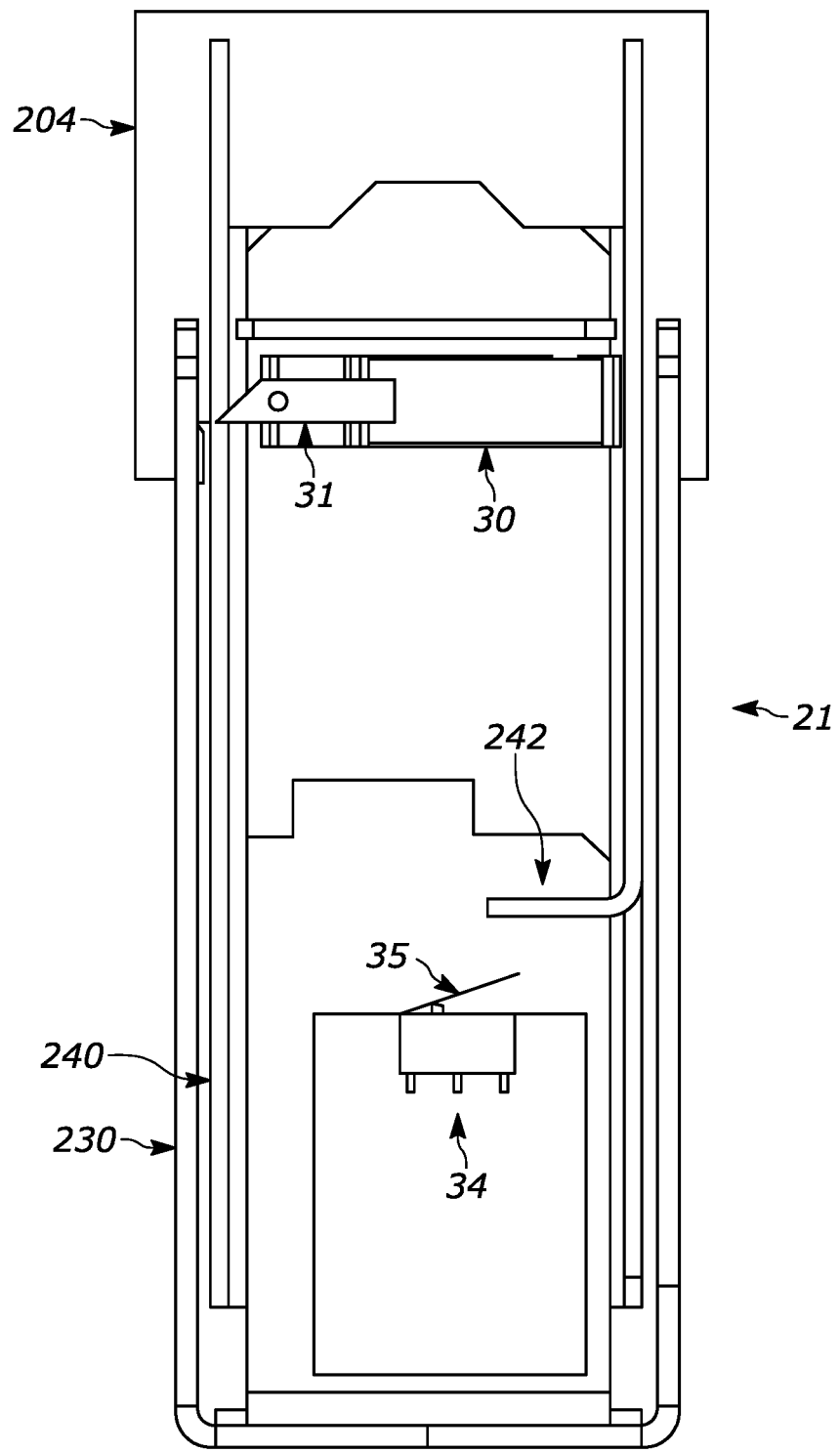
FIG. 6B illustrates a schematic showing internal components of the retainer while the retainer is positioned between the default/rest position and a reception position, shortly after moving from the default position.

FIG. 6A illustrates a perspective view of the retainer 21 after the user has moved the retainer 21 away from its default position. FIG. 6B illustrates a schematic showing internal components of the retainer 21 after the retainer 21 has been moved away from its default position.

The detector 34 detects movement of the retainer 21 away from the default position. In this example, movement of the moving part 240 of the retainer 21 causes the actuator 242 to move away from the switch 35. The processing circuitry 36 determines from the inputs from the detector 34 that the retainer 21 has moved away from its default position (e.g., by determining that a signal that was present when the switch 35 was being actuated is now absent) and responds by controlling the latch bolt 31 of the lock 30 to retract.

The user continues to lift the clamp 200 of the retainer 21 upwards, such that the retainer 21 eventually reaches its retention position. In this example, when the retainer 21 is in the retention position, the shape of the retainer 21 and its arrangement relative to the base 11 means that a hand portable electronic device cannot be inserted into the retainer 21 at this point. This is at least in part due to the shape of the projecting portion 204 of the clamp 200, which projects (downwardly) towards the base 11 (e.g., see FIGS. 1A to 2B).

When the retainer 21 is in its retention position, the latch bolt 31 of the lock 30 is aligned with the keep of the lock 30. As explained above, in this example, the keep is located in the moving part 240. The keep may, for example, be an aperture in the moving part 240. However, at this point in time, the latch bolt 31 is retracted and does not, therefore, enter the keep. The retainer 21 therefore remains in an unlocked configuration and does not transition to a locked configuration.

Upon determining that the retainer 21 has left the default position, the processing circuitry 36 may cause the latch bolt 31 to be retracted for a predetermined period of time. If so, there is no need for a further trigger to cause the retraction of the latch bolt 31 to cease. The processing circuitry 36 might, for example, control a driver to apply a signal to the lock 30 for a predetermined period of time in order for the latch bolt 31 to remain retracted for that predetermined period of time.

The duration of the predetermined period of time is at least the time that it would ordinarily take a user to move the retainer 21 (in the first direction) from the default position and beyond the retention position, so that the retainer 21 does not inadvertently enter its locked configuration as the clamp 200 is being moved upwardly by the user.

The retainer 21 continues to be moved in the first (upwards) direction until, in block 404 in FIG. 4, the retainer 21 reaches its reception position. The retention position is located along the first direction between the default position and the reception position.

When the retainer 21 is in its reception position, it is able to receive a hand portable electronic device. That is, moving part 240 has moved far enough in the first direction such that the projecting portion 204 of the clamp 200 no longer prevents a hand portable electronic device from being inserted into the retainer 21. Furthermore, the space between the overhanging portion 202 of the clamp 200 and the base 11 is large enough to allow a hand portable electronic device to be inserted into the retainer 21, such that it is located underneath the overhanging portion 202 and above the base 11.

Figure 7A:
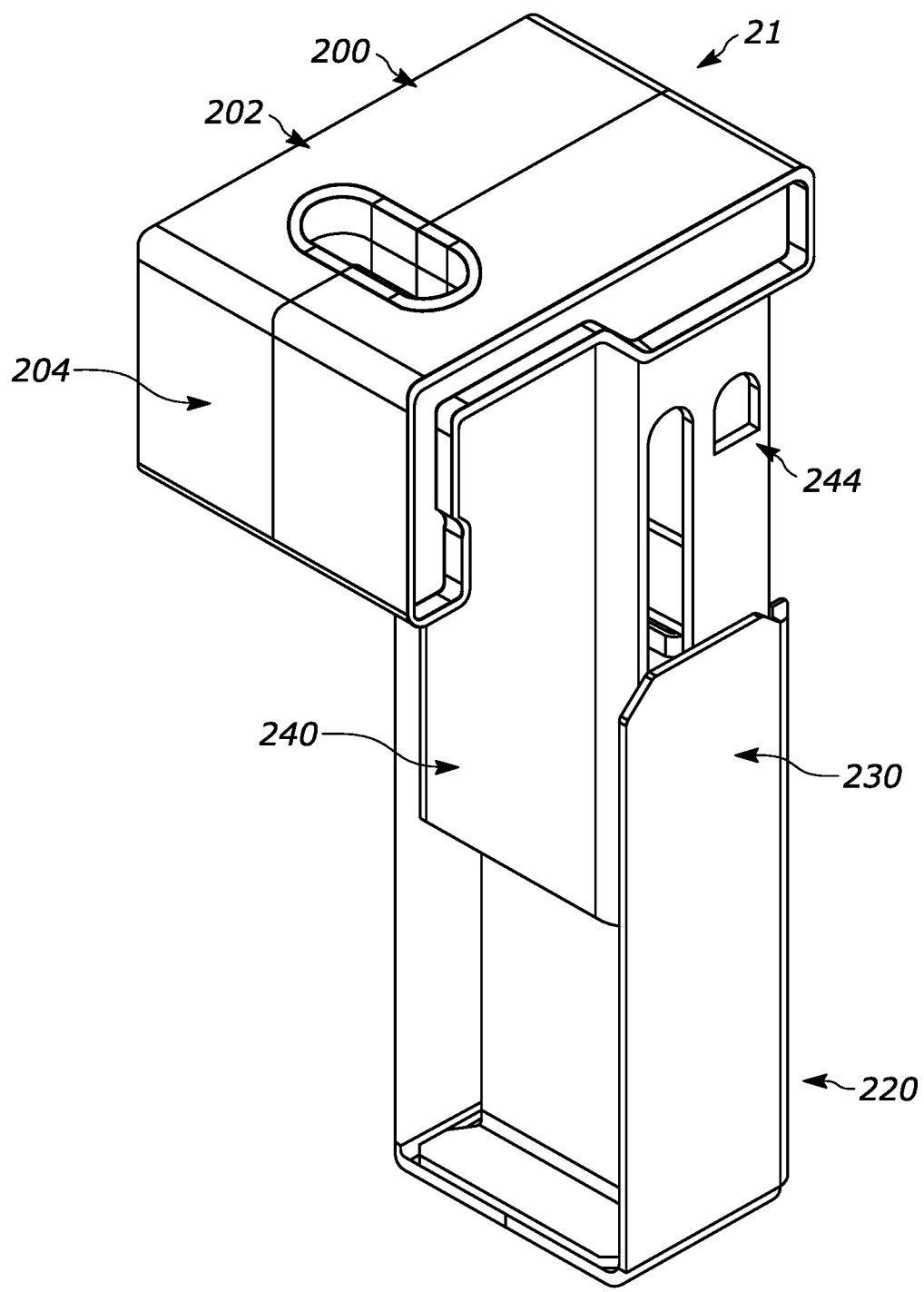
FIG. 7A illustrates a perspective view of the retainer of the apparatus in the reception position.

FIG. 7A illustrates a perspective view of the retainer 21 in the reception position. The keep 244 of the lock 30 is visible in FIG. 7A.

Figure 7B:
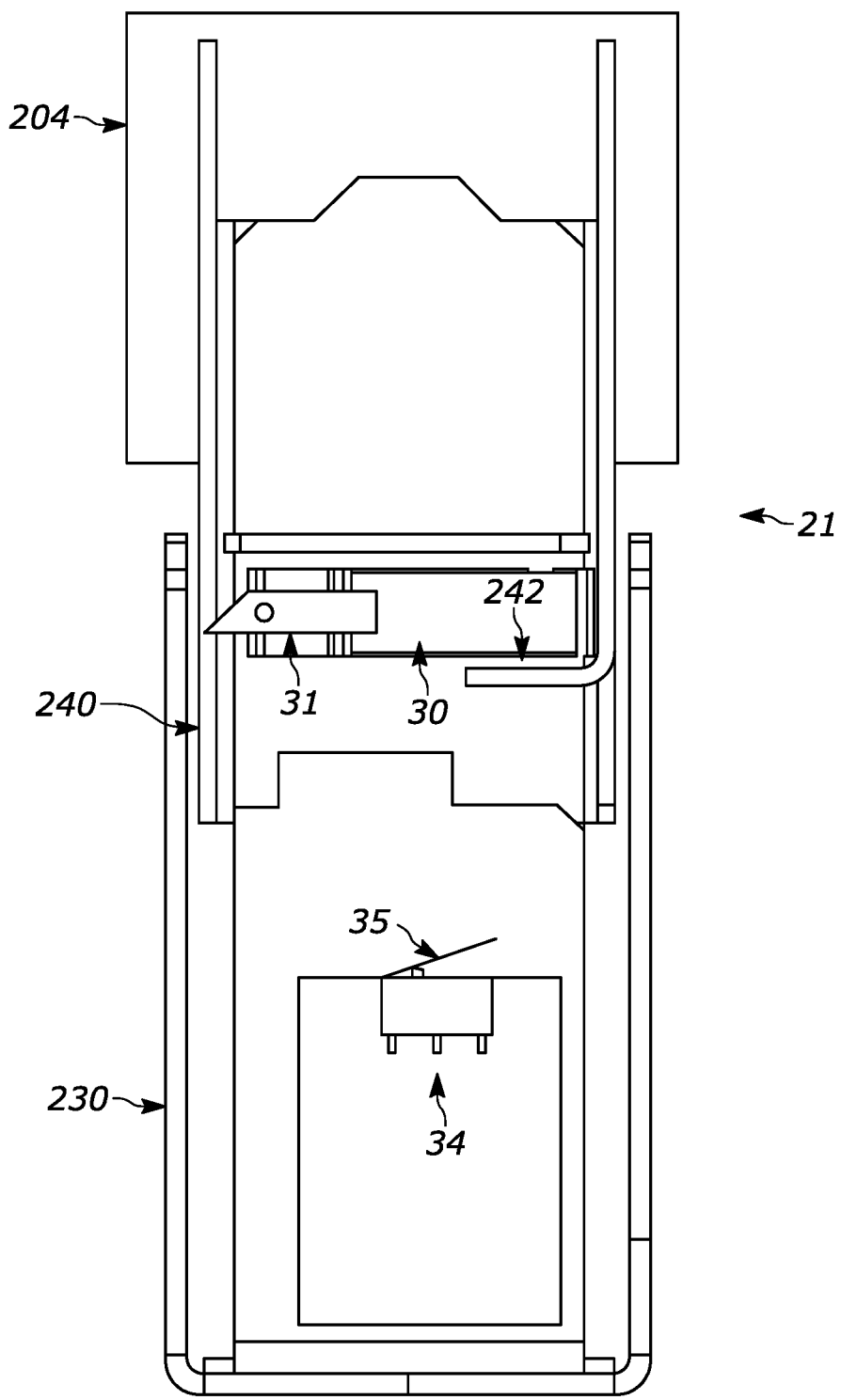
FIG. 7B illustrates a schematic showing internal components of the retainer while the retainer is positioned in the reception position.

FIG. 7B illustrates a schematic showing internal components of the retainer 21 while the retainer 21 is positioned in the reception position. It can be seen in FIG. 7B, that in this example, the retainer 21 has reached an extremity of its movement such that the actuator 242 abuts the lock 30. It will be appreciated by those skilled in the art, however, that other possibilities exist for limiting the movement of the retainer 21. For example, the actuator 242 might abut something other than the lock 30, or the moveable part 240 might contain a portion other than the actuator 242 that limits its movement, and that portion might or might not abut the lock 30.

It can be seen in FIG. 7B that the latch bolt 31 remains retracted. This is not necessary; once the keep 244 has passed the latch, it need not be retracted any more. Thus, as explained above, duration of the period of time for which the latch bolt 31 is retracted need only be sufficient to enable the user to move the keep beyond the latch bolt 31 in the first direction, such that the lock 30 does not transition the retainer 21 into a locked configuration as the clamp 200 is being lifted.

In some alternative implementations, a detector may be provided to detect when the retainer 21 has been moved in the first direction past the retention position at which the latch bolt 31 is aligned with the keep. For example, the detector might detect when the retainer 21 has reached the reception position. This might be done, for example, by the actuation of a switch by an actuation portion of the moving part 240 when the retainer 21 reaches the reception position. The actuation portion might be the same or different from the actuation portion 242 that activates the switch 35. In these embodiments, the processing circuitry 36 might be configured to cause cessation of the retraction of the latch bolt in response to inputs from the detector indicating that the retainer 21 has moved beyond the retention position in the first direction (such as reaching the reception position).

At block 405 in FIG. 4, a hand portable electronic device is inserted into the retainer 21 while the retainer 21 is in the reception position. This is shown in FIGS. 1A, 1B and 1C in which the retainer labelled with the reference numeral 23 is shown in the reception position after a hand portable electronic device 200c has been inserted. It is also shown in FIGS. 2A and 2B in which the retainer labelled with reference numeral 21 is shown in the reception position after a hand portable electronic device 200c has been inserted.

The predetermined period of time expires, such that the lock 30 is no longer being driven to retract the latch bolt 31 and, consequently, the latch bolt 31 is biased towards its latching position. However, given that the latch bolt 31 is not yet aligned with the keep 244, it cannot enter the keep 244 and the retainer 21 does therefore not transition into a locked configuration. Instead, the biased latch bolt 31 abuts a wall of the moving part 240.

In block 406 in FIG. 4, while the hand portable electronic device is located in the retainer 21, the retainer 21 moves in the second direction back towards the retention position due to the user by pushing down on the clamp 200.

When the clamp 200 reaches a position at which the keep 244 is aligned with the latch bolt 31, as the latch bolt 31 is biased towards the latching position, the latch bolt 31 enters the latching position by entering the keep 244, causing the retainer 21 to transition from the unlocked configuration to the locked configuration. The retainer 21 is now locked in the retention position, at which it retains the hand portable electronic device. It will be understood by those skilled in the art that, in this implementation, the retention position is the only position at which the retainer 21 can transition from the unlocked configuration to the locked configuration and vice-versa. This is because the retention position is the only position at which the latch bolt 31 is aligned with the keep 244.

Figure 8A:
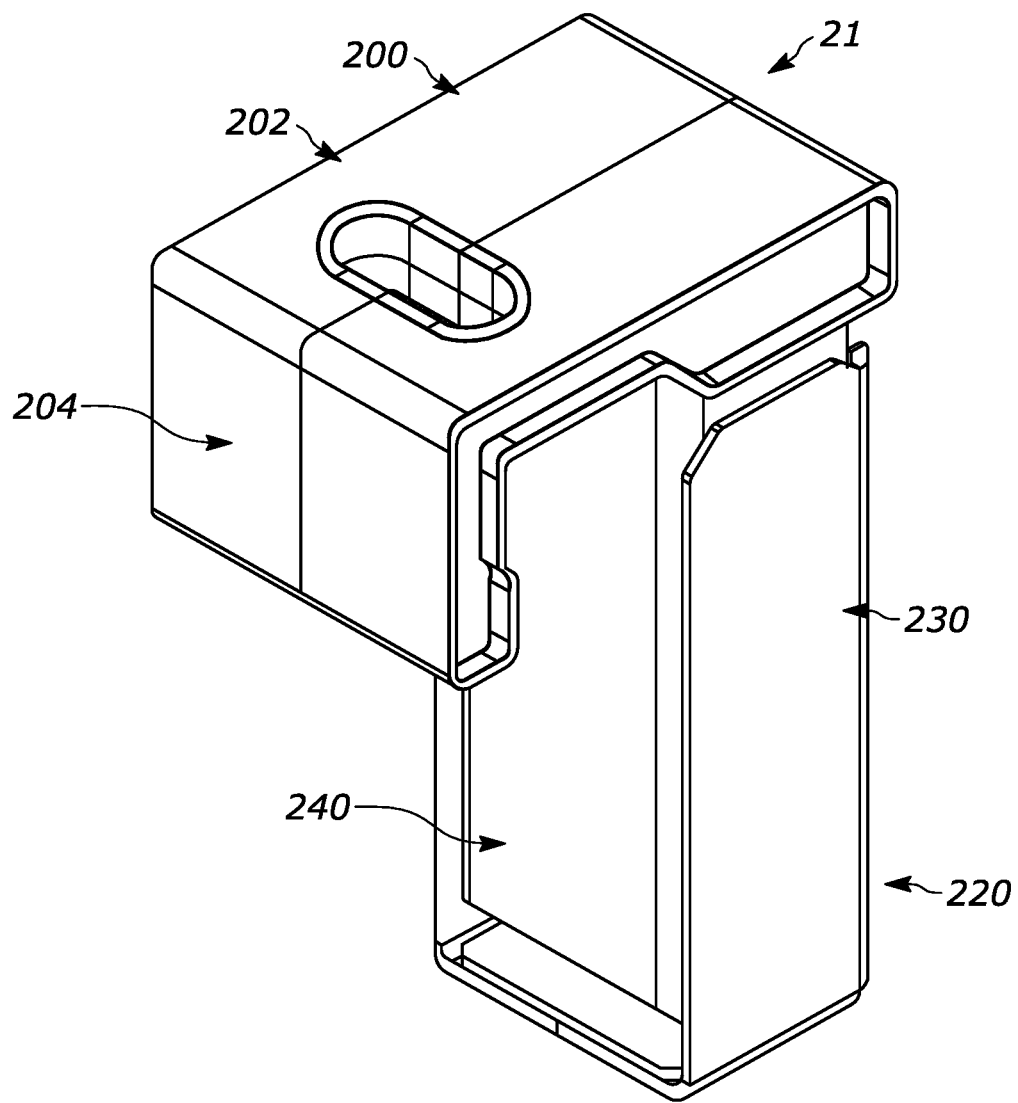
FIG. 8A illustrates a perspective view of the retainer of the apparatus in a retention position.

FIG. 8A illustrates a perspective view of the retainer 21 in the retention position. At this point in the method of FIG. 4, a hand portable electronic device is retained by the retainer 21, but this is not shown in FIG. 8A. It is shown, for example, in FIGS. 1A, 1B and 1C, which show the retainers labelled with the reference numerals 21 and 22 in the retention position retaining hand portable electronic devices 200a, 200b. Similarly, FIGS. 2A and 2B show the retainers labelled with the reference numerals 22 and 23 in the retention position retaining hand portable electronic devices 200b, 200c.

A hand portable electronic device retained by the retainer 21 while the retainer 21 is in the retention position cannot be removed from the retainer 21. That is, the positioning of the retainer 21 relative to the base 11 and the shape and configuration of the retainer 21 and base 11 prevent the hand portable electronic device from being removed. Removal of the hand portable electronic device requires at least some movement of the device in the upwards/first direction, which is impossible to the positioning of the locked retainer 21.

It can be seen in FIG. 1A, for example, that the base 11 has upwardly extending sides that prevent sideways removal of the hand portable electronic device. This, however, need not be the case in other implementations. For instance, if the hand portable electronic device is placed on the base 11 such that a connector of the base 11 (e.g., an electrical connector for charging a battery of the device) enters a port of the device, this may be sufficient to prevent sideways movement of the device while the device is being retained.

Figure 8B:
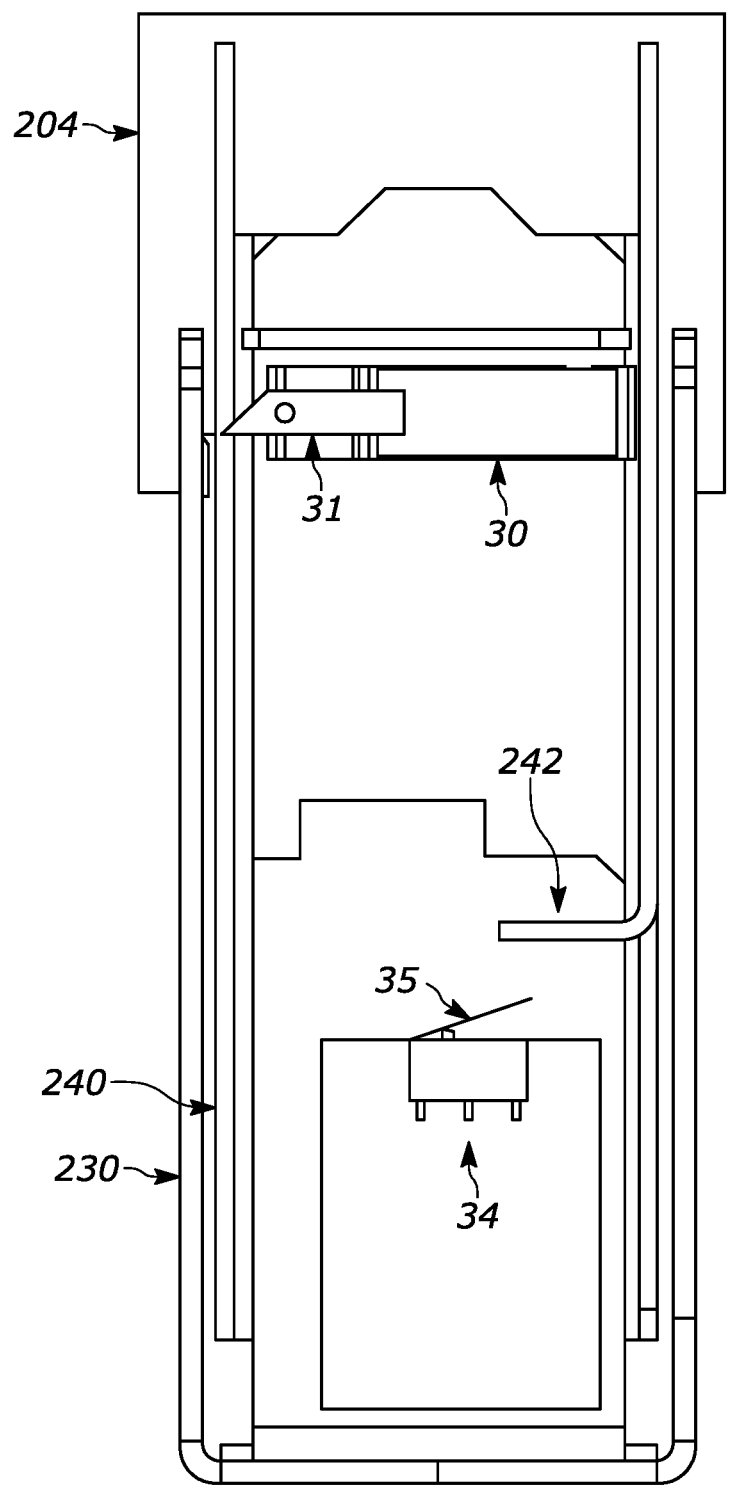
FIG. 8B illustrates a schematic showing internal components of the retainer while the retainer is positioned in the retention position.

FIG. 8B illustrates a schematic showing internal components of the retainer 21 while the retainer 21 is in the retention position retaining a hand portable electronic device. It can be seen in FIG. 8B that the detector 34 has not detected the retainer 21 moving back to the default position because the actuator 242 has not actuated the switch 35. If the retainer 21 had not been transitioned to its locked configuration and a hand portable electronic device had not been placed in the retainer 21 and the retainer 21 had been able to revert back to its default position (e.g., due to an external force being applied by the user), the detector 34 would have detected the retainer 21 returning to its default position and this would have been reflected in the inputs provided to the processing circuitry 36.

In this example, the user now wishes to retrieve her hand portable electronic device from the retainer 21. In order to do this, the user transitions the hand portable electronic device from its locked configuration to its unlocked configuration. The user may do this, for example, by inputting a password or a PIN. In other examples, the user may provide inputs to cause the hand portable electronic device to scan a code (e.g., a bar code or a QR code) through the aperture in the overhanging portion 202 of the clamp 200. The scanning of a recognised code causes the hand portable electronic device to transition from its locked configuration to its unlocked configuration.

After the user has transitioned the retained hand portable electronic device to its unlocked configuration, the device transmits at least one wireless signal. The wireless signal(s) might be emitted directly in response to the transition to the unlocked configuration, or following one or more further inputs at the hand portable electronic device. In block 407 in FIG. 4, the at least one wireless signal emitted by the device is sensed by the one or more sensors 32 of the retainer 21, which provides corresponding inputs to the processing circuitry 36.

The wireless signal(s) emitted by the device might be one or more light signals or one or more audio signals. The wireless signal(s) might be one or more time-varying signals.

In block 408 in FIG. 4, the processing circuitry 36 analyses the inputs from the one or more sensors 32. It may, for example, compare data in the received signal(s) with one or more signal patterns 42 stored in the memory 38.

The processing circuitry 36 controls the lock 30 to transition the retainer 21 from the locked configuration to the unlocked configuration based on the wireless signal(s) received by the sensor 32. For example, the processing circuitry 36 may control the lock to transition the retainer 21 to the unlocked configuration if the data in the one or more wireless signals received by the sensors 32 is determined to be an appropriate match with the one or more signal patterns 42 stored in the memory 38.

In order to transition the retainer 21 from the locked configuration to the unlocked configuration, the processing circuitry controls the lock 30 to retract the latch bolt 31. After doing this, the retainer 21 does not move in the second (downwards) direction to any appreciable extent because the clamp 200 is supported from underneath by the hand portable electronic device being retained by the retainer 21. It cannot, for example, move in the second direction to the default position without removal of the hand portable electronic device from the retainer 21.

In block 409 of FIG. 4, the user moves the retainer 21 in the first (upwards) direction to its release position in order to enable the hand portable electronic device to be removed, and in block 410 in FIG. 4, the user removes the hand portable electronic device from the retainer 21. In some examples, the release position may be the same as the reception position illustrated in FIGS. 7A and 7B.

In some implementations, the retainer 21 comprises a plurality of light sensors 32 for receiving light signals emitted by the display of a retained hand portable electronic device. The light sensors 32 may be positioned in the projecting portion 204 of the clamp 200, such that they face a device retained in the retainer 21. Each light sensor might be directed towards a different portion of the display of a retained device. After the user has transitioned the device into its unlocked configuration, for instance, by entering a password or a PIN, different portions of the display of the device may emit different time varying light signals, such that each light sensor 32 of the retainer 21 receives a different light signal. This is advantageous for security purposes, because it makes the light signal very difficult to imitate by somebody attempting to steal the hand portable electronic device. For instance, the light signal cannot be easily mimicked using a torch.

The hand portable electronic device comprises processing circuitry and memory storing computer program instructions that, when executed by the processing circuitry, cause the hand portable electronic device to emit the one or more wireless signals in response to the hand portable electronic device has been transitioned from its locked configuration to its unlocked configuration.

Embodiments of the invention provide an apparatus 100 and method for securely retaining one or more hand portable electronic devices 200*a*, 200*b*, 200*c*, such that each of the devices 200*a*, 200*b*, 200*c* may only be retrieved by a person that is able to unlock that device 200*a*, 200*b*, 200*c*, for example, by inputting a password or personal identification number (PIN).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Blocks illustrated in FIG. 4 may represent steps in a method and/or sections of code in the computer program 40. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavouring in the foregoing specification to draw attention to those features believed to be of importance it should be understood that the applicant may seek protection via the claims in respect of any patentable feature or combination of features hereinbefore referred to and/or shown in the drawings whether or not emphasis has been placed thereon.

We claim:

1. A locking apparatus for retaining one or more hand held portable electronic devices, the locking apparatus comprising:
 a retainer configured for receiving and retaining a hand portable electronic device in a secured state relative to the locking apparatus;
 an electronically operated lock configured to translate the retainer between an unlocked configuration and a locked configuration, wherein in the locked configuration the retainer is arranged to prevent release of a hand portable electronic device retained by the retainer;

at least one sensor arranged to receive at least one wireless signal emitted by the hand portable electronic device retained by the retainer; and processing circuitry configured to control the lock to transition the retainer from the locked configuration to the unlocked configuration based on the at least one wireless signal received by the sensor from the hand portable electronic device when retained by the retainer and by means of authentication the hand portable electronic device is transitioned from a locked state to an unlocked state, thereby allowing the retainer to release the hand portable electronic device such that it can be removed from the locking apparatus.

2. The apparatus of claim 1, wherein the retainer configured to be movable between a first position and a second position, and the lock is configured to transition the retainer from the unlocked configuration to the locked configuration in response to the retainer being moved to the second position.

3. The apparatus of claim 2, wherein the lock comprises a latch bolt that is biased to transition the lock into the locked configuration when the retainer is moved to the second position.

4. The apparatus of claim 3, wherein the retainer comprises a keep that is positioned to receive the latch bolt when the retainer is in the second position.

5. The apparatus of claim 2, wherein the retainer is configured to be movable between the second position and a third position.

6. The apparatus of claim 5, wherein the first position is a reception position in which the retainer is configured to receive the hand portable electronic device, the second position is a retention position in which the retainer is configured to retain the hand portable electronic device, and the third position is a rest position.

7. The apparatus of claim 5, wherein the retainer is configured such that a hand portable electronic device cannot be received by the retainer when the retainer is in the third position.

8. The apparatus of claim 5, wherein the second position is between the first position and the third position.

9. The apparatus of claim 5, wherein the retainer further comprises: a detector configured to detect movement of the retainer away from the third position and towards the second position, wherein the processing circuitry is configured to respond to detection, by the detector, of movement of the retainer from the third position by retracting a latch bolt.

10. The apparatus of claim 9, wherein the detector comprises a switch and is configured to detect movement of the retainer from the third position based, at least in part, on release of the switch.

11. The apparatus of claim 9, wherein the processing circuitry is configured to respond to detection of movement of the retainer from the third position by the detector by retracting the latch bolt for a predetermined period of time.

12. The apparatus of claim 1, wherein the at least one sensor comprises at least one light sensor, and the at least one wireless signal is at least one light signal emitted by the display of the hand portable electronic device retained by the retainer.

13. The apparatus of claim 12, wherein the at least one light sensor comprises at least a first light sensor and at least a second light sensor, wherein the first light sensor is arranged to receive a first light signal emitted by a first portion of the display of the hand portable electronic device retained by the retainer, and the second light sensor is arranged to receive a second light signal emitted by a second portion of the display of the hand portable electronic device retained by the retainer.

14. The apparatus of claim 13, wherein the first light signal is a first time-varying light pattern and the second light signal is a second time-varying light pattern.

15. The apparatus of claim 1, wherein the retainer further comprises a clamp arranged to prevent release of the hand portable electronic device retained by the retainer when the retainer is in the locked configuration.

* * * * *